United States Patent [19]

Shultz

[11] Patent Number: 4,469,661

[45] Date of Patent: Sep. 4, 1984

[54] DESTRUCTION OF POLYCHLORINATED BIPHENYLS AND OTHER HAZARDOUS HALOGENATED HYDROCARBONS

[76] Inventor: Clifford G. Shultz, 1701 Glendale, Evansville, Ind. 47712

[21] Appl. No.: 346,636

[22] Filed: Apr. 6, 1982

[51] Int. Cl.³ .............................................. B01D 53/34
[52] U.S. Cl. .................................. 423/210.5; 423/495; 423/DIG. 12
[58] Field of Search .................... 423/DIG. 12, 210.5, 423/495

[56] References Cited

U.S. PATENT DOCUMENTS 3,343,911 9/1967 Eisenlohr ............................. 423/495
4,246,255 1/1981 Grantham ......................... 423/210.5

Primary Examiner—Earl C. Thomas
Assistant Examiner—Jeffrey E. Russel

[57] ABSTRACT

This invention relates to the destruction of polychlorinated biphenyls (PCBs) and other hazardous halogenated hydrocarbons by treating solids contaminated with such to extract the halogenated hydrocarbon, vaporizing extract and contacting the vapor with a bath containing molten metallic aluminum.

7 Claims, 1 Drawing Figure

SYSTEM FOR EXTRACTION
AND DESTRUCTION OF HALOGENATED
ORGANIC WASTES (PCBs, ETC.)

SYSTEM FOR EXTRACTION
AND DESTRUCTION OF HALOGENATED
ORGANIC WASTES (PCBs, ETC.)

DESTRUCTION OF POLYCHLORINATED BIPHENYLS AND OTHER HAZARDOUS HALOGENATED HYDROCARBONS

BACKGROUND OF THE INVENTION

The destruction of polychlorinated biphenyls (PCBs) has been the subject of a great deal of speculation, controversy, and research. The presently acceptable method is high temperature incineration, followed by scrubbing the off-gas to remove hydrogen chloride. This is reported to be 99.99% efficient. This means that if one hundred tons are "destroyed" annually, that only twenty pounds will be allowed to escape to the atmosphere in the vicinity of the incinerator—a considerable quantity! Part of the material which thus escapes can be presumed to be dioxins, which are extremely toxic, and thus a greater hazard than an equivalent quantity of PCB.

Recent publications *Chemical Week*, Sept. 17, 1980, and *Chemical and Engineering News*, Sept. 22, 1980) have publicized a liquid method which is portable, and reclaims the transformer oils which are contaminated by the PCBs.

In addition to PCBs, there are many halogenated pesticides, chemical intermediates, and side products which are filling both legal and illegal dump sites and present serious hazards to the public health. There are also millions of tons of equipment, soils and sludges which are contaminated with these materials. This invention is applicable to destruction of these materials in a safe, inexpensive manner.

DESCRIPTION OF THE INVENTION

Figure 1:
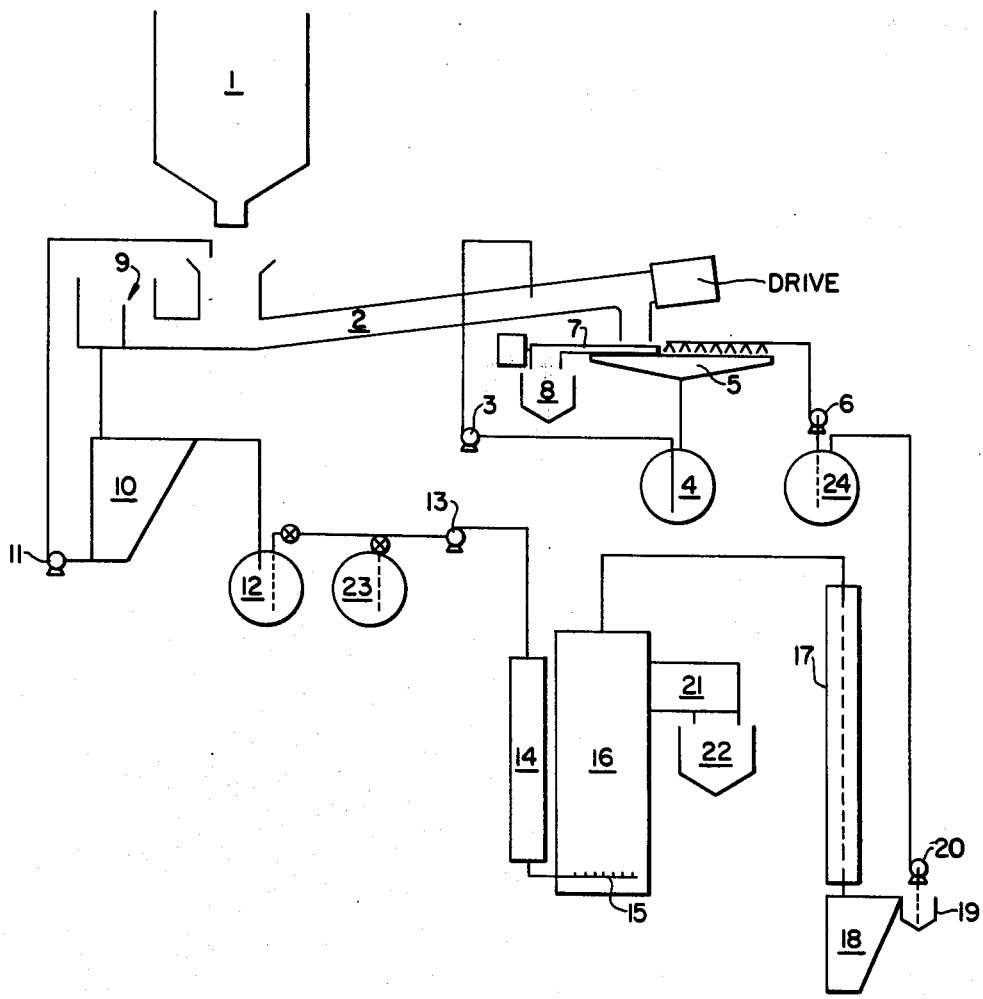
FIG. 1 is a schematic representation of an embodiment of the invention.

It has now been found that halogenated organic compounds will react with hot aluminum, and that the chlorine will be abstracted from the organic material. This reaction produces aluminum chloride, a volatile salt; which may then distill from the reaction mixture. This will leave a slag of aluminum compounds, or a volatile or liquid aluminum alkyl or aryl compound. Other metals which have these desirable chemical properties include the alkali metals, alkaline earth metals, iron, zinc and the "rare earth" metals. The use of aluminum is preferred because of its low melting point, ready availability, stability at ordinary temperatures, and the volatility of its anhydrous chloride salt. Sodium-based methods require 23 pounds of sodium to remove 35.5 pounds of chloride, while only 9 pounds of aluminum is required. Aluminum is also much easier and safer to handle and ship.

The process of the invention includes (1) the direct reaction of the liquid PCBs; (2) the passage of PCB-contaminated oils or solvents through the reactor, so the PCBs react, and the oils distill from the reactor; or (3) the extraction of the PCBs from soil or other contaminated material with a suitable high-boiling hydrocarbon solvent and subsequent passage through the reactor. Reaction with either heated metal or molten metal is possible; however, molten metal is preferred since it provides a better contact with the reactant PCB, and also provides a continuously renewed reacting surface to the PCBs.

A presently-preferred embodiment of the invention is shown in FIG. 1. This embodiment involves the extraction of the PCB, pesticide, or other hazardous halogenated organic material. The extractant can be a hydrocarbon solvent such as fuel oil or other inexpensive hydrocarbon solvent. In the event the waste material is a contaminated oil, it can be fed directly to the reactor.

The contaminated solid (air-dried or freeze-dried to minimize moisture) is placed in hopper (1) from which it is conveyed upward by a screw conveyor (2). The conveyor has an inlet for the solvent, and remains nearly full of solvent. As the contaminated solids rise in the conveyor, they are bathed in the solvent supplied by pump (3) from the oil storage tank (4). As the solids rise, the concentration of PCB in the extracting oil becomes less. The wet solids are discharged onto a vacuum drum filter (5) where they are given a final spray rinse with clear solvent supplied by pump (6), the solvent drawn out by vacuum, and drained to the oil storage tank (4). The solids are discharged from the face of the filter by means of a screw conveyor (7) into a hopper or truck (8) for removal.

The extracting solvent grows progressively more concentrated with contaminant as it passes downward through the conveyor trough (2) and finally passes over a weir (9) which holds back most of the solids. The overflow passes into a laminar flow separator (10) which allows the solids to settle. They are drawn off along with enough solvent to make a pumpable slurry, and pumped by pump (11) back to the solids inlet. The PCB-containing solvents flows to a storage tank (12) ready for destruction of the PCB. It is pumped by pump (13) into a heat exchanger (14) which flash-heats the solvents and PCBs to vaporize them. The vapor then passes through apertures in the inlet pipe (15) into the molten aluminum contained in the furnace/reactor (16). Reaction occurs to destroy PCBs and form aluminum chloride; the solvent passes through the reactor. Both are condensed in the condensor (17). Since the aluminum chloride is a solid, it will be separated in the second laminar flow separator (18). The solid AlCl$_3$ can be removed under anhydrous conditions, purified and used in other processes. The solvent will flow into reservoir (19) and be transferred by pump (20) into the clean solvent storage tank (24). The slag formed in the reactor will be skimmed as necessary through a lock system (21), and placed in hopper (22) for disposal.

PCB-contaminated transformer oils will be stored in storage tank (23). From here it can be pumped by pump (13) directly into the flash heater (14).

The embodiment uses a laminar-flow separator as a means of separating fine solids from the PCB-containing oils and the aluminum chloride from the distilled oils or solvent only as a means of illustrating the principle. Other means of separation, including screening, filtering or centrifugation, would serve the same purpose.

The embodiment uses a molten reaction mixture consisting of aluminum, only as a means of illustrating the principle of reaction with a molten metal. A low-boiling eutectic of aluminum and zinc, or of aluminum, zinc and magnesium; eutectic mixtures containing iron, calcium, or other metals heated would be expected to give equivalent results with the exception of the composition of the end products. Aluminum is preferred due to its low melting point, reactivity, ready availability, and low cost.

The embodiment describes the use of a separate heat exchanger to convert the solvent and the PCB to the vapor state at a pressure sufficient to drive it through the apertures into the reaction melt. Including it as a part of the reactor, or as a separate compartment of the reactor would perform the same function.

The embodiment also includes allowing the aluminum chloride to separate from the condensed solvent. A lower temperature would allow the solid salt to separate from the solvent.

The embodiment describes a treatment of PCB-contaminated oil or solids. It could also include reaction of pure PCBs, in which case, there would be no recovered oil.

The embodiment also describes the use of pure molten metals as a single-metal melt or as a eutectic mixture of pure metals. Recovered "scrap" metals could be used as well, either alone or as eutectic melts.

The temperature of the reaction is not unduly critical within practical limits. The process operates well at any temperature at which the metal remains molten. It must remain at a high enough temperature to allow the vapors to pass through the metal.

The reaction will also take place at temperatures below the melting point of aluminum, but the reaction product will coat the metal, and the metal will not present a continuously self-renewing surface.

The process of the invention can be optimized by elevating the temperature, thereby reducing the viscosity of the melt, but stopping short of the temperature at which the transformer oil (non-PCB) or carrier solvent becomes thermally unstable.

PROCESS

The process of the invention involves bringing about the reaction of the PCBs with molten aluminum metal.

Reaction of only one aluminum atom to abstract three chlorine atoms from one of the rings will de-stabilize the molecule, forming a free radical.

Further reaction would involve stripping all the chlorine atoms off the molecule, leaving carbon or aluminum carbide and aluminum chloride. Since each molecule of PCB will be surrounded by aluminum atoms, and their associated electrons, it is not expected that this reaction would take place in such a simplified sequence. It would more probably result in the formation of $AlCl_3$, $Al_4C_3$, and some carbon, according to the overall reaction:

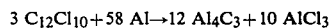

$$3\ C_{12}Cl_{10} + 58\ Al \rightarrow 12\ Al_4C_3 + 10\ AlCl_3$$

The aluminum chloride formed would be volatile at the temperature of the melt, and would distill from the mixture, and could be condensed to be used as a catalyst for commercial Friedel Crafts reactions, or as a flocculaent for waste water treatment. The carbide could generate methane gas upon hydrolysis.

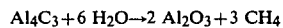

$$Al_4C_3 + 6\ H_2O \rightarrow 2\ Al_2O_3 + 3\ CH_4$$

There follows several examples related to the invention. It is to be understood that these examples are illustrative, rather than limiting.

EXAMPLE 1

A transformer oil containing PCB and having a boiling point of 280° C. was heated with strips of aluminum foil. Partial decomposition was evidenced by the appearance of a green color, indicating the probable formation of aluminum carbide. The residue was found to contain 8.72% chloride ion. This corresponds to a PCB concentration of 12.25% in the oil.

EXAMPLE 2

The same transformer oil as was used in Example 1 was distilled in the presence of aluminum in a distillation flask. This resulted in the formation of only 5.67% of chloride. This indicates that the reaction was incomplete in the time required for the liquid to distill, but constitutes firm evidence that this reaction does take place.

EXAMPLE 3

The same oil was heated for 30 minutes in a sealed tube with aluminum foil at 500° C. This resulted in recovery of 21.5% chloride. This indicates that, in the absence of intimate contact with the metal, there is an appreciable time requirement. This should be obviated by the use of molten metal.

EXAMPLE 4

The melting point of aluminum is 660° C. Addition of zinc metal lowers the melting point to a minimum at 382° C. At this point, the zinc must be 95% of the melt, and might become a major reactant, resulting in the formation of $ZnCl_2$, which would separate in the molten state. The use of an intermediate concentration of zinc could lower the temperature to obtain the optimal conversion reaction. If the aluminum reacts preferentially, it would be possible to feed in fresh aluminum as it is removed by the reaction. If the zinc reacts preferentially, it may be found to be more economical than aluminum, when energy requirements are taken into consideration.

EXAMPLE 5

Aluminum forms a eutectic mixture with 79% aluminum, 13% magnesium and 8% zinc. This has a minimum melting point at about 500° C. It is advisable to operate at the lowest possible temperature at which the desired reaction takes place efficiently. This allows the solvent or transformer oil to pass through the system without thermal decomposition. The preponderance of aluminum in this system makes it economically desirable compared to the high zinc eutectic.

It is to be understood that the invention can be practised with any of the procedures on any halogenated wastes, whether hazardous or not; using any metals or mixtures of metals, under various conditions of temperature and pressure; including those set forth hereinabove but not limited thereto. The selection of the metals, eutectic mixtures, temperatures and apparatus can be varied. Those skilled in the art can readily vary and adapt the teachings of the invention to a set of circumstances found in a certain situation.

What is claimed is:
1. A process for destroying hazardous halogenated hydrocarbon, said process comprising the steps of
   (a) treating solids contaminated with hazardous halogenated hydrocarbon to extract hazardous halogenated hydrocarbon therefrom and produce a liquid containing said hazardous halogenated hydrocarbon,
   (b) vaporizing liquid formed in step (a),
   (c) contacting the formed vapor with molten metal comprising aluminum to remove halogen from said hazardous halogenated hydrocarbon and leave a slag.

2. A process as recited in claim 1 wherein step (b) is carried out in a zone separate from the zone where step (c) is carried out.

3. A process recited in claim 2 wherein said hazardous halogenated hydrocarbon comprises polychlorinated biphenyl.

4. A process as recited in claim 3 wherein the slag is periodically removed.

5. A process as recited in claim 4 wherein aluminum trichloride is a by-product and is separated and purified.

6. A process as recited in claim 5 wherein polychlorinated biphenyl is reacted with said molten metal.

7. A process as recited in claim 1 wherein said hazardous halogenated hydrocarbon comprises polychlorinated biphenyl.

* * * * *